No. 866,060. PATENTED SEPT. 17, 1907.
J. E. PFLUEGER.
FISHING REEL.
APPLICATION FILED NOV. 21, 1906.

Witnesses:
Edna Bortz
Nellie Patterson

Inventor;
Joseph E. Pflueger
by
C. E. Humphrey
Atty.

UNITED STATES PATENT OFFICE.

JOSEPH E. PFLUEGER, OF AKRON, OHIO, ASSIGNOR TO THE ENTERPRISE MANUFACTURING COMPANY, OF AKRON, OHIO, A CORPORATION OF OHIO.

FISHING-REEL.

No. 866,060.  Specification of Letters Patent.  Patented Sept. 17, 1907.

Application filed November 21, 1906. Serial No. 344,483.

*To all whom it may concern:*

Be it known that I, JOSEPH E. PFLUEGER, a citizen of the United States, residing at Akron, in the county of Summit and State of Ohio, have invented new and useful Improvements in Fishing-Reels, of which the following is a specification.

This invention has relation to fishing-reels, and the object thereof is to provide a new and improved thumb-brake therefor.

Heretofore thumb-brakes have consisted of a piece of suitable material, such as leather or rubber, freely mounted on one of the pillars of the reel, and which could be swung into position to be pressed by the thumb of the fisherman against the body of line wound on the drum portion of the reel, to produce a desired tension on the outgoing line. The free mounting of the brake, permits it when not in use, either to lie loosely on the line, or else swing downwardly into such a position that it could not be readily reached and brought into action at the critical moment when most needed; and hence, in order to remedy this difficulty and keep the brake free from the line and in an inoperative position but ready for instant use, I so construct the same that its normal position will be substantially tangential to the body of line on the drum, that it is always ready to be operated by the fisherman.

With the foregoing and other objects in view, the invention consists in the novel construction, combination and arrangement of parts constituting the invention to be hereinafter referred to and illustrated in the accompanying drawings which form a part of this specification in which is shown the preferred embodiment of the invention, but it is to be understood that changes, variations and modifications can be resorted to which come within the scope of the claims hereunto appended.

Figure 1:
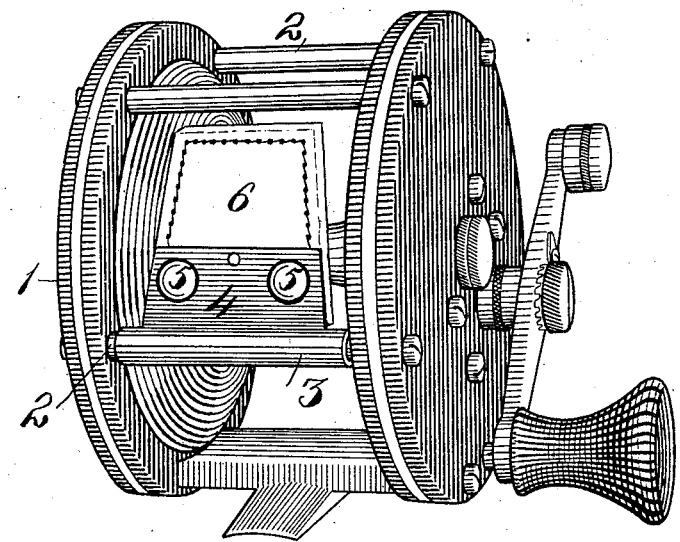
Figure 3:
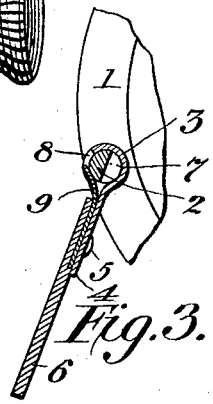
Figure 2:
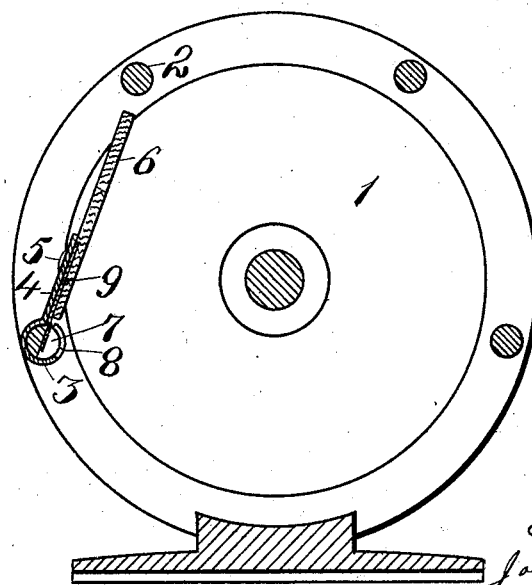

In the drawings, in which similar reference numerals indicate like parts in the different figures: Figure 1 is a perspective of a fishing-reel with my improved thumb-brake in position thereon; Fig. 2 is a transverse, central section of the device shown in Fig. 1, and Fig. 3 is a detail showing the brake in the position when swung downward out of operative position for engaging the line on the reel.

In the drawings, the reference numeral 1 indicates an ordinary fishing-reel of any approved construction; but as the general makeup or design of the reel is unimportant to the understanding of this invention, a detailed description thereof is omitted.

The side plates of the reel are united in the ordinary manner by a plurality of pillars 2, 2. The pillar nearest to the operator is the one customarily employed for mounting the thumb-brake; and the brake in this invention consists of a sleeve portion 3 surrounding and loosely-movable thereon. From this sleeve portion 3 extends a wing 4, to which is secured by suitable means, such as rivets 5, a piece of leather or rubber 6 constituting the braking member. Near the transverse central portion of the pillar on which the brake is mounted is formed a recess of such configuration that the balance of the pillar is provided with a flat face constituting an abutment, indicated in the drawings by the reference numeral 7 in Fig. 2, and a registering opening 8 is cut in the sleeve 3.

Carried by the wing 4 and the braking member 6 is a spring element 9 having a projecting portion arranged to enter the recess 7 and bear against the abutment formed by the flat portion of the pillar left after the recess 7 has been formed. The action of the spring element 9 against the flat face of the abutment formed by the recess in the pillar 2 will serve to retain the entire brake in the inoperative position indicated in the drawings, but this action of the spring element will be so light that a slight pressure by the thumb of the operator will serve to force it forward against the line on the drum of the reel, and the instant the thumb is removed, the brake will return to its normal or inoperative position. The brake may be swung backwardly out of the way at any time, this being permitted by the fact that the spring 9 will ride over the cylindrical portion of the pillar 1 and project through the slot 8 in the sleeve 3.

It will be seen from the foregoing that this device affords an unusually simple and effective means for constantly maintaining the brake accurately in position for use, and that the force exerted by the spring to maintain the brake in inoperative position will in nowise detract from the usefulness thereof.

Experience has shown that where the brake is freely mounted on the pillar, it almost invariably hangs downward and cannot be reached quickly enough by the operator to make it available.

Having thus described my invention, what I claim and desire to secure by Letters Patent, is:

1. The combination in a reel provided with transversely-arranged pillars, one of which is provided with a notch, of a brake consisting of a sleeve arranged to inclose said pillar, provided with an extended strip of material to bear on the line, and a spring arranged to enter said notch and maintain said brake normally tangential to the body of line wound on said reel.

2. A thumb brake for fishing reels, comprising a revoluble sleeve provided with a wing, a braking member connected thereto and moved to braking position by the application of pressure, a resilient member having a portion of its length interposed between said wing and braking member, and an abutment adapted to be engaged by the free end of said resilient member, thereby maintaining said braking member in its inoperative position, said resilient member adapted to automatically return said braking member to inoperative position when pressure is removed from said braking member.

3. A thumb brake for fishing reels, comprising a loosely-mounted braking member movable to braking position on the application of pressure, a resilient member carried by said braking member and adapted to automatically return it to inoperative position when pressure is removed therefrom and to normally maintain said braking member in inoperative position, and an abutment for one end of said resilient member.

4. A thumb brake for fishing reels, comprising a loosely-mounted braking member movable to braking position on the application of pressure, a resilient member carried by said braking member and adapted to automatically return it to inoperative position when pressure is removed therefrom and to normally maintain said braking member in inoperative position.

In testimony whereof I have hereunto set my hand in presence of two subscribing witnesses.

JOSEPH E. PFLUEGER.

Witnesses:
C. E. HUMPHREY,
GLENARA FOX.